(12) United States Patent
Wei

(10) Patent No.: US 6,398,941 B2
(45) Date of Patent: *Jun. 4, 2002

(54) METHOD OF SHAPING A WORKPIECE USING AN ELECTROCHEMICAL MACHINING TOOL

(75) Inventor: Bin Wei, Clifton Park, NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,174

(22) Filed: Jun. 13, 1997

(51) Int. Cl.$^7$ .............................. B23H 3/00; C25F 3/00; H05K 3/07

(52) U.S. Cl. ...................... 205/641; 205/644; 205/645; 205/652

(58) Field of Search ........................ 205/640, 641–645, 205/652, 686, 644; 204/224 M

(56) References Cited

U.S. PATENT DOCUMENTS

| | | | | |
|---|---|---|---|---|
| 3,271,281 | A | * 9/1966 | Brown et al. | 204/143 |
| 4,217,190 | A | * 8/1980 | Neal et al. | 204/129.35 |
| 5,567,300 | A | * 10/1996 | Datta et al. | 205/652 |
| 5,567,304 | A | * 10/1996 | Datta et al. | 205/666 |

OTHER PUBLICATIONS

H. A. Nied and M. S. Lamphere, Boundary Element Modeling of the Electrochemical Machining Process, Proc. Numiform Conference, Cornell University, Jun. 18–21, 1995.

H.A. Nied and M.S. Lamphere, 2D Electrochemical Airfoil Machining Process Model, 95–GT–272 Am. Soc. Mech. Eng. (1995). No month avail.

C. A. Brebbia and J. Dominguez, Boundary Elements, an Introductory Course, table of contents, 45–56 (1989). No month avail.

Y. Zhou and J. J. Derby, The Cathode Design Problem in Electrochemical Machining, 50 Chem. Eng. Sci. 2679–2689 (1995). No month avail.

S. Das and A. K. Mitra, *Use of Boundary Element Method for the Determination of Tool Shape in Electrochemical Machining*, 35 Int. J. Numerical Methods in Eng. 1045–1054 (1992), No Month avail.

D. Zhu and C.Y. Yu, Investigation on the Design of Tool Shape in ECM, Am. Soc. Mech. Eng., Production Engineering Division, vol. 58, Precision Machining: Technology and Machine Development and Improvement 181–190 (1992). No month avail.

Roland Hunt, An Embedding Method of the Numerical Solution of the Cathode Design Problem in Electrochemical Machining, 29 Int'l J. for Numerical Meth. in Eng. 1177–1192 (1990). No month avail.

(List continued on next page.)

*Primary Examiner*—Bruce F. Bell
*Assistant Examiner*—Wesley A. Nicolas
(74) *Attorney, Agent, or Firm*—Patrick K. Patnode; Christian G. Cabou

(57) ABSTRACT

A method of shaping a tool comprises the steps of defining a shape of an article to be formed with the tool as a plurality of first elements; defining an initial shape of the tool as a plurality of second elements; determining an electric potential of each of the first and second elements; determining an equipotential line between the article and the initial shape of the tool based on the electric potential of the first and second elements; and forming the tool to have a shape coincident with the equipotential line.

3 Claims, 3 Drawing Sheets

OTHER PUBLICATIONS

A.L. Krylov, The Cauchy Problem for the Laplace Equation in the Theory of Electrochemical Metal Machining, 13 Soviet Physics 15–17 (1968). No month avail.

H.A. Nied and E.M. Perry, *Finite Element Simulation of the Electrochemical Machining Process*, 20 Computer Modeling and Simulation of Manufacturing Processes (ASME) 37–57 (1990), No Month avail.

R.H. Nilson and Y.G. Tsuei, Free Boundary Problem for the Laplace Equation with Application to ECM Tool Design, Journal of Applied Mechanics; Transactions of the ASME 54–58 (Mar. 1976).

* cited by examiner

METHOD OF SHAPING A WORKPIECE USING AN ELECTROCHEMICAL MACHINING TOOL

BACKGROUND

Electrochemical machining (ECM) is a process in which an electrically conductive metal workpiece is shaped by removing material through anodic dissolution. In ECM, the workpiece comprises the anode in an electrolytic cell, the tool comprises the cathode, and an electrolyte is pumped through a gap between the workpiece and the tool. When a potential difference is applied between the tool and the workpiece, current flows through the electrolyte as a result of electrochemical reactions taking place at the surfaces of both electrodes. The reaction at the anode workpiece surface removes material by the oxidation of metal atoms, while the cathode surface is typically unaffected by the reduction reaction occurring there. ECM is a non-contact machining process that can quickly shape any electrically conductive material regardless of the hardness or toughness of the material. The ECM process is also advantageous because it does not produce residual stresses in the workpiece.

In ECM, the tool is formed as an approximately complementary shape of the desired workpiece shape. The tool geometry is copied into the workpiece by electrochemical dissolution to obtain the desired workpiece shape. During the copying process, a gap is established between the tool and the workpiece, as the tool feed rate becomes substantially equal to the rate of workpiece dissolution. The gap size often varies significantly at different locations over the machining region due to, primarily, the non-uniformity of the electric field and temperature field in the region. As a result, the workpiece does not take on the exact shape of the tool. To obtain a desired workpiece shape with desired accuracy, the tool geometry is modified to compensate for the non-uniform gap distribution over the machining region.

Modeling of the relationship between the shape of the tool and the resulting shape of the workpiece can be complex due to modeling of the electrolyte flow, modeling of the electrochemical reactions in the gap region, tool surface, and workpiece surface, and modeling of the electric field which is influenced by all of these factors. Thus, the problem of predicting the workpiece surface resulting from a known tool shape (commonly known as "the direct problem") can be relatively complex.

The problem of determining a tool shape based on a desired workpiece shape (commonly known as "the inverse problem"), introduces an additional degree of complexity. Known methods of determining a tool shape based on a desired workpiece shape typically utilize an iterative process. For example, Shuvra Das et al., *Use of Boundary Element Method for the Determination of Tool Shape in Electrochemical Machining*, International Journal for Numerical Methods in Engineering, Vol. 35, 1045-1054 (1992), describes an algorithm based on the boundary integral equation technique which utilizes a non-linear optimization method. Through an iterative process, the shape of the cathode tool is determined by minimizing a functional. In this approach, the inverse problem is converted to a direct problem by assuming a tool shape and its boundary conditions, and the shape is adjusted based on the feedback from the computed results. This approach typically takes a large amount of computational resources to complete the iterations and may have problems with convergence. The iterations also introduce approximations which adversely affect the accuracy of the results.

It would be desirable, therefore, to have a method for directly determining the tool shape needed to produce a desired workpiece shape, without iteration, and without approximation.

SUMMARY

A method of shaping a tool, according to an exemplary embodiment of the invention, comprises the steps of defining a shape of an article to be formed with the tool as a plurality of first elements; defining an initial shape of the tool as a plurality of second elements; determining an electric potential of each of the first and second elements; determining an equipotential line between the article and the initial tool shape based on the electric potential of the first and second elements; and forming the tool to have a shape coincident with the equipotential line.

BRIEF DESCRIPTION OF THE DRAWINGS

Other features and advantages of the invention will be more readily understood upon reading the following detailed description, taken in conjunction with the drawings, in which.

DETAILED DESCRIPTION OF THE PREFERRED EMBODIMENTS

Figure 1:
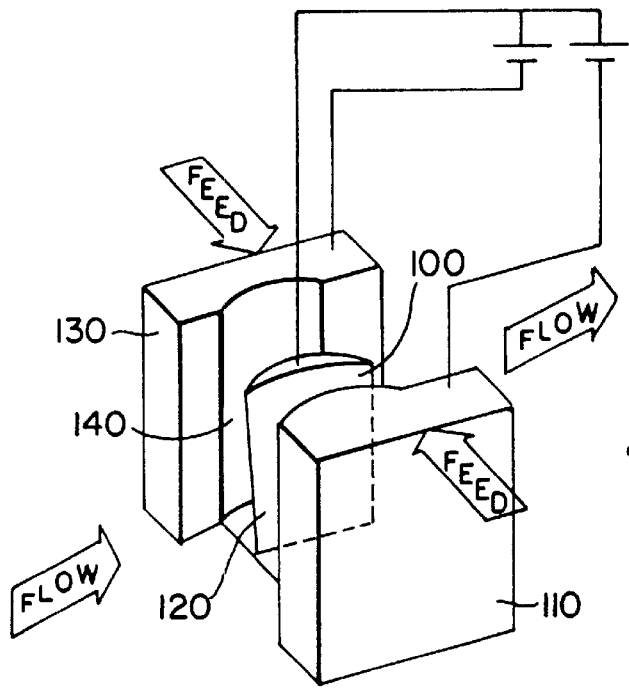
FIG. 1 is a drawing of an electrochemical machining process.

FIG. 1 illustrates an electrochemical machining apparatus which includes electrodes formed according to an exemplary embodiment of the invention. In the electrochemical machining process, an electrolytic cell is formed with the workpiece 100, the tool 110, and the electrolyte which flows in a gap 120 between the tool 110 and the workpiece 100. In FIG. 1, a second electrolytic cell is formed between a second tool 130, the workpiece 100, and the electrolyte which flows through a second gap 140. Electrochemical machining is particularly suitable for the formation of an airfoil, as shown in FIG. 1, which may comprise a very hard material, such as a high temperature superalloy, of complex shape.

As shown in FIG. 1, in each electrolytic cell, the tool 110, 130 forms the cathode, and the workpiece 100 forms the anode. An electric potential is maintained across the two electrodes. During the machining process, the tool 110, 130 is moved towards the workpiece 100 at a certain feed rate, and the workpiece 100 slowly takes a shape that is approximately complementary to the shape of the tool. After an initial period, an equilibrium is reached in which the tool feed rate is substantially equal to the rate at which material is removed from the workpiece such that a substantially constant gap width is maintained between the tool and the workpiece.

The reaction at the anode surface removes material by the oxidation of metal atoms, while the cathode surface is typically unaffected by the hydrogen reduction reaction occurring there. The electrolyte, which may be $NaNO_3$ for example, oxidizes the metal atoms of the workpiece and removes the oxidized metal atoms. The electrolyte has a volumetric electrochemical equivalent $K_v$ ($mm^3$/coulomb) and a conductivity κ (1/mm·ohm), which may be suitably adjusted for a particular application.

Figure 2:
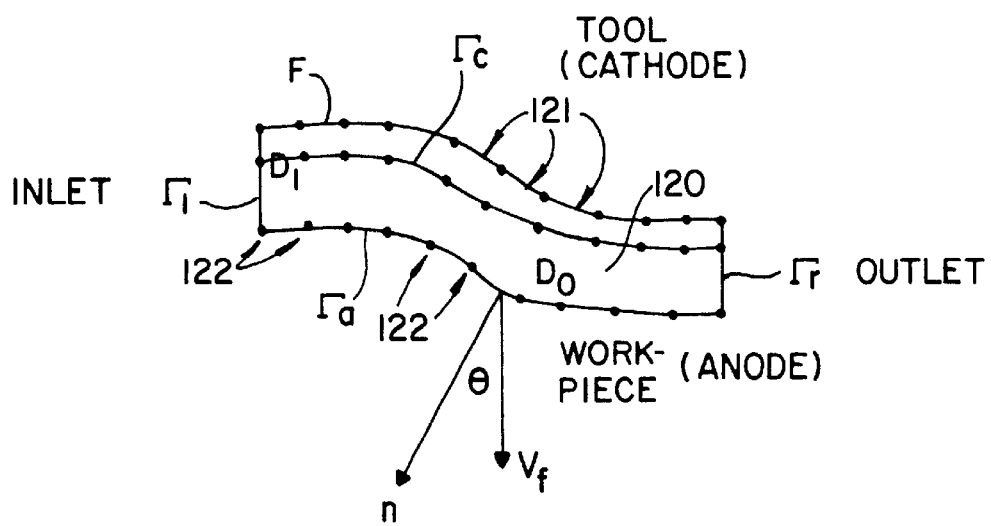
FIG. 2 is a drawing of the gap between the tool and the workpiece in an electrochemical machining process.

FIG. 2 illustrates the gap between the tool and the workpiece. The gap is defined by a plurality of surfaces. $\Gamma_c$ is the surface of the cathode tool which forms one side of the gap. $\Gamma_a$ is the surface of the anode workpiece which forms an opposing side the gap. $\Gamma_l$ and $\Gamma_r$ are the left and right surfaces, respectively, of the gap through which the electrolyte flows, which may form the inlet and the outlet to the gap, respectively. The function F is a boundary function which represents an initial tool shape. Each of the surfaces of the gap $\Gamma_c$, $\Gamma_a$, $\Gamma_l$ and $\Gamma_r$, as well as the boundary function F, comprise a plurality of boundary elements 121 delineated by nodes 122, as will be discussed further below. The vector n is a surface normal vector. The vector $V_f$ represents the magnitude and direction of the tool feed rate.

The electric potential in the gap 120 is described by the Laplace equation:

$$\nabla^2 \phi = \frac{\partial^2 \phi}{\partial x^2} + \frac{\partial^2 \phi}{\partial y^2} = 0 \quad (1)$$

where φ is the electric potential in the gap as a function of the cartesian coordinates x and y.

Figure 3:
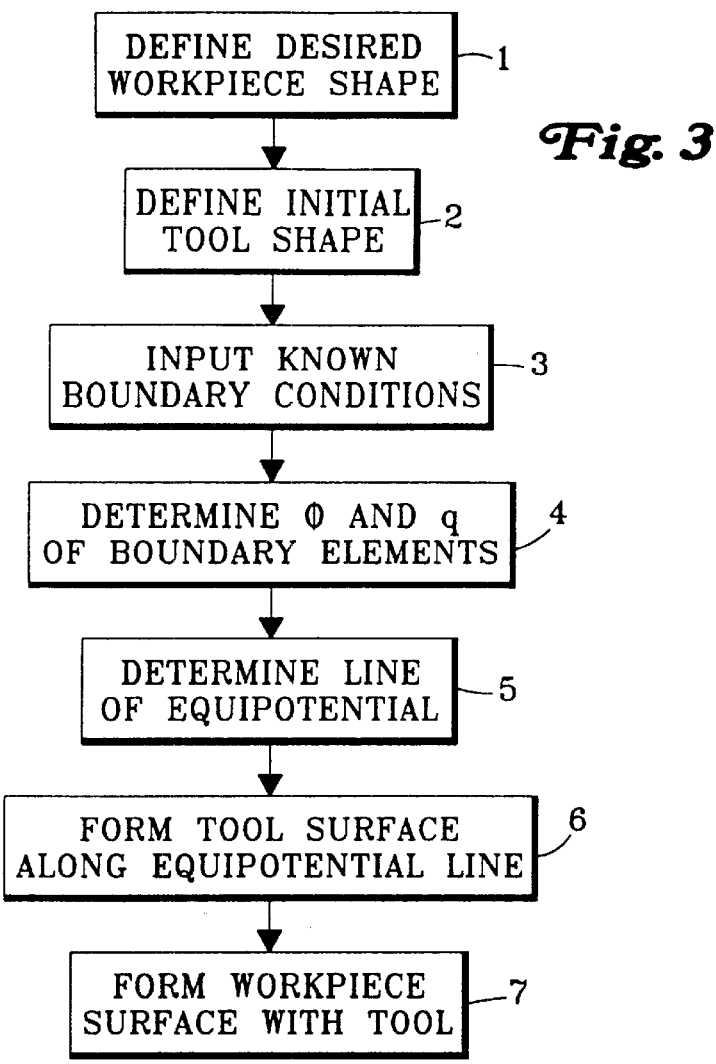
FIG. 3 is a flow chart illustrating a method according to an exemplary embodiment of the invention.
Figure 7:
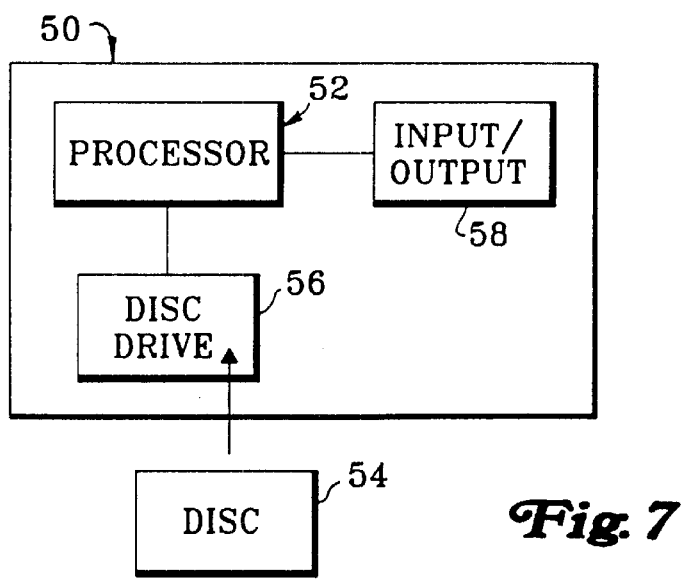
FIG. 7 is a diagram of an apparatus which can be used to carry out the method of FIG. 3.

FIG. 3 is a flow chart which illustrates a method according to an exemplary embodiment of the invention. FIG. 7 illustrates an apparatus which may be used to carry out the method shown in FIG. 3. As shown in FIG. 7, the method may be implemented with a computer 50 which includes a microprocessor 52 which reads computer readable program code. The computer readable program code is typically contained in an article of manufacture comprising a computer usable medium 54 such as floppy disk, hard drive disc, or other storage medium. The computer usable medium 54 contains electromagnetically fixed instructions to carry out the method shown in FIG. 3. The computer 50 includes a disc drive 56 which reads the computer useable medium 54. An input/output device 58 allows information to be exchanged between a user and the computer 50.

According to an exemplary embodiment of the invention, the initial step of the method shown in FIG. 3 involves defining the desired surface shape of the workpiece as the function $\Gamma_a$, which is a surface geometry. $\Gamma_a$ may comprise a plurality of boundary elements, delineated by nodes, which define the desired workpiece shape.

Step 2 of FIG. 3 comprises defining an initial tool shape. The tool shape is initially unknown, and may be represented for a cross section of the tool by the boundary function F, which may be a function of two variables F=F(x,y), for example. The boundary function F is selected such that it encloses a domain $D_1$ with the known boundaries $\Gamma_l$, $\Gamma_r$ and $\Gamma_a$, as shown in FIG. 2. The domain $D_1$ includes the domain $D_0$ as a subset, which defines the final tool shape. In this way, the final tool boundary $\Gamma_c$ can be obtained, since it lies within the domain $D_1$.

The boundary function F may be set initially according the cosine θ method. According to the cosine θ method, a plurality of segments are extended perpendicularly from the workpiece surface. Typically, one segment is extended from each boundary element 121 of the workpiece surface. Each segment has a length which is equal to a predetermined distance, e.g. 1.5 times the desired gap width, divided by the angle θ between the tool feed rate direction $V_f$ and the surface normal direction n. The ends of the plurality of the segments define the boundary function F. The boundary function F may comprise a plurality of elements which together represent the initial tool shape. The boundary function F defines an initial surface shape of the tool, but is not modeled as an actual tool. Therefore, the electric potential on the boundary function F is not necessarily constant.

The cosine θ method can be used for the entire surface of the workpiece, but is typically used for sections of the workpiece in which the angle θ is less than or equal to 65 degrees, for example. If the angle θ is greater than 65 degrees in a section of the workpiece, a constant offset, for example 3.5 times the desired gap width, can be used as the length of the segments extending perpendicularly from the workpiece. The offset 3.5 is typically used, since 1.5/cos(65) is about 3.5, which results in a smooth transition between sections above and below 65 degrees.

Step 3 of the exemplary method shown in FIG. 3 involves inputting known boundary conditions of the system shown in FIG. 2 into equation (1), the Laplace equation. Typically, it is assumed that no electrolyte concentration or temperature gradients exist within the gap; the current efficiency and any surface overpotentials are constant; the gap has reached an equilibrium state; and the electric field distribution in the gap region and the current and potential follow a primary distribution. The known boundary conditions can be described as follows:

$$\phi = U_0 \quad (2)$$

$$q_a = \frac{\partial \phi}{\partial n} = \frac{V_f}{K_v \cdot \kappa} \cdot \cos \theta \quad (3)$$

$$\partial_i = \frac{\partial \phi}{\partial n} = 0 \quad (4)$$

$$\partial_0 = \frac{\partial \phi}{\partial n} = 0 \quad (5)$$

where $U_O$ is the electric potential on the anode workpiece boundary, $q_a$ is the potential normal gradient on the anode boundary, $V_f$ is tool feed rate (mm/sec), $K_v$ is the volumetric electrochemical equivalent of the electrolyte ($mm^3$/coulomb), κ is the electrolyte conductivity (1/mm·ohm), θ is the angle between the anode normal direction (n) and the tool feed direction ($V_f$), $q_l$ is the potential normal gradient at the electrolyte inlet boundary $\Gamma_l$, and $q_r$ is the potential normal gradient at the electrolyte outlet boundary $\Gamma_r$. The electrolyte conductivity κ is typically assumed to be constant, and can be measured at the inlet of the gap, for example. The volumetric electrochemical equivalent can also be obtained empirically.

The unknown boundary conditions are as follows:

$$\Gamma = \Gamma(x,y) \quad (6)$$

$$\phi = u(x,y) \quad (7)$$

$$q = \partial \phi / \partial n \quad (8)$$

where Γ is the unknown tool boundary, φ is the potential on the initial tool boundary function F, and q is the partial derivative of the potential φ with respect to the normal n on the initial tool boundary function F.

Figure 6:
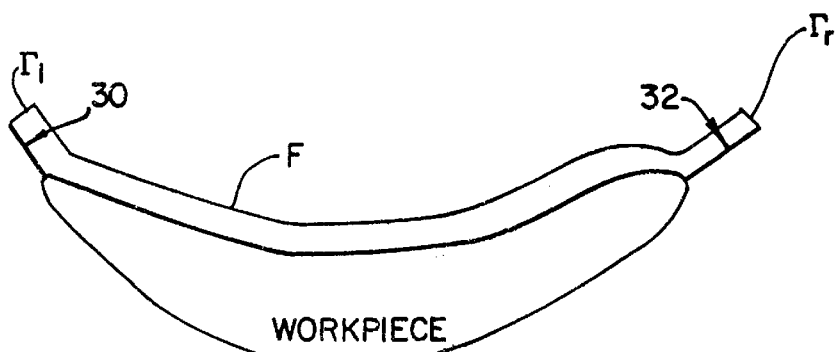
FIG. 6 is a diagram of a method of constructing boundaries of the gap shown in FIG. 2.

Equations (4) and (5) indicate that the boundaries $\Gamma_l$ and $\Gamma_r$ are electric current lines. To satisfy equations (4) and (5), the boundaries $\Gamma_l$ and $\Gamma_r$ can be constructed as follows. In FIG. 6, the desired workpiece shape has been modified to facilitate formation of the boundaries $\Gamma_l$ and $\Gamma_r$. The modified workpiece includes two thin plates 30 and 32 of infinitesimal thickness extending perpendicularly from the left and right sides of the workpiece, respectively. The plates 30 and 32 may extend from the workpiece at the points at which the radius of curvature of the workpiece is smallest, for example. The boundary function F generated in the region of the plates 30 and 32 is a straight line parallel to the plates 30, 32. The inlet boundary $\Gamma_l$ is formed as a segment which is perpendicular to the plate 30 and which intersects the boundary function F. The outlet boundary $\Gamma_r$ is formed as a segment which is perpendicular to the plate 32 and which intersects the boundary function F. The boundaries $\Gamma_l$ and $\Gamma_r$ satisfy equations (4) and (5) if the lengths of the plates 30 and 32 are about twice as large as the gap between the plates 30, 32 and the boundary function F. Although the desired workpiece shape is altered slightly due to the addition of the plates 30, 32, the actual machined workpiece shape will be affected only slightly, since the thickness of the plates 30, 32 is infinitesimal. Modeling of the plates 30, 32 allows the boundary conditions of equations (4) and (5) to be satisfied.

Step 4 in the method of FIG. 3 involves the determination of values for the potential $\phi$ along the boundaries F, $\Gamma_l$, and $\Gamma_r$, and the potential normal gradient q along the boundary F. To calculate the electric potential and the potential normal gradient values along the boundaries of the domain $D_1$, the boundary element method (BEM) can be utilized in conjunction with the Laplace equation which describes the electric field in the domain $D_1$. The boundary element method involves discretizing the boundaries of the domain $D_1$ into a plurality of elements and determining the electric potential and potential normal gradients of each of the elements.

Equation (1), the Laplace equation, with the initial tool boundary F and boundary equations (2)–(5) can be transformed into a boundary integral element model using Green's theorem as follows:

$$\int_{D_l} (\nabla^2 \phi^*) \phi \, dD = -\int_{\Gamma_a} q_a \phi^* d\Gamma - \int_{\Gamma_0} q_0 \phi^* d\Gamma - \int_F q \phi^* d\Gamma - \int_{\Gamma_i} q_i \phi^* d\Gamma + \int_{\Gamma_a} U_o q^* d\Gamma + \int_{\Gamma_0} \phi q^* d\Gamma + \int_F \phi q^* d\Gamma + \int_{\Gamma_i} \phi q^* d\Gamma \quad (9)$$

where $\phi^*$ is the fundamental solution, and $q^*$ is the partial derivative of the fundamental solution with respect to the normal n.

The boundary of $D_1$ is then discretized by dividing it into N boundary elements separated by nodes. For each boundary element, the values of $\phi$ and q are assumed to be constant over each element and equal to the value at each mid-point node. The corresponding boundary element model is then as follows:

$$\frac{1}{2}\phi^i + \sum_{i=1}^{N} \int_{\Gamma_j} \phi q^* d\Gamma = \sum_{j=1}^{N} \int_{\Gamma_j} \phi q^* d\Gamma \quad (10)$$

The point 1 is one of the boundary nodes and $\Gamma_j$ is the boundary of element j. To simplify Equation (10), two functions H and G can be defined as follows:

$$H^{ij} = \int_{\Gamma_j} q^* d\Gamma \text{ for } i \neq j \quad (11a)$$

$$H^{ij} = \frac{1}{2} + \int_{\Gamma_j} q^* d\Gamma \text{ for } i = j \quad (11b)$$

$$G^{ij} = \int_{\Gamma_j} \phi^* d\Gamma. \quad (12)$$

Equation (10) then becomes:

$$\sum_{j=1}^{N} H^{ij} \phi^j = \sum_{j=1}^{N} G^{ij} q^j \quad (13)$$

The set of equations described by equation (13) can be expressed in a matrix form as:

$$H\Phi = GQ \quad (14)$$

where H and G are N×N matrices, and $\Phi$ and Q are N×1 vectors. $\Phi$ and Q contain, respectively, the potential and potential gradient values for all the boundary nodes. The total number of unknowns to be solved is $N_r + 2N_c + N_l$, where $N_a$, $N_r$, $N_c$, and $N_l$ are the numbers of elements on the boundaries of the anode, electrolyte outlet, boundary function F, and electrolyte inlet, respectively.

By grouping the vectors in $\Phi$ and Q and partitioning the matrices H and G according to the grouped vectors, equation (14) can be rewritten as follows:

$$\begin{bmatrix} h11 & h12 & h13 & h14 \\ h21 & h22 & h23 & h24 \\ h31 & h32 & h33 & h34 \\ h41 & h42 & h43 & h44 \end{bmatrix} \begin{bmatrix} \Phi a \\ \Phi r \\ \Phi c \\ \Phi l \end{bmatrix} = \begin{bmatrix} g11 & g12 & g13 & g14 \\ g21 & g22 & g23 & g24 \\ g31 & g32 & g33 & g34 \\ g41 & g42 & g43 & g44 \end{bmatrix} \begin{bmatrix} Qa \\ Qr \\ Qc \\ Ql \end{bmatrix}. \quad (15)$$

where $\Phi_a$ and $Q_a$ are $N_a \times 1$ vectors that respectively contain the known nodal potential and potential gradient values on the workpiece boundary, $\Phi_r$ and $Q_r$ are $N_r \times 1$ vectors respectively containing the unknown nodal potential and known potential gradient values on the right outlet boundary, $\Phi_c$ and $Q_c$ are $N_c \times 1$ vectors respectively containing the unknown nodal potential and potential gradient values on the boundary function F, and $\Phi_l$ and $Q_l$ are $N_l \times 1$ vectors respectively containing the unknown nodal potential and known potential gradient values on the left inlet boundary. hij and gij are submatrices of H and G after partitioning.

After introducing the known boundary conditions described in equations (2) through (5) into equation (15), the unknown vectors and known vectors in equation (15) are separated to obtain the following equation:

$$\begin{bmatrix} -g13 & h12 & h13 & h14 \\ -g23 & h22 & h23 & h24 \\ -g33 & h32 & h33 & h34 \\ -g43 & h42 & h43 & h44 \end{bmatrix} \begin{bmatrix} Qc \\ \Phi r \\ \Phi c \\ \Phi l \end{bmatrix} = \begin{bmatrix} g11 & g12 & -h11 & g14 \\ g21 & g22 & -h21 & g24 \\ g31 & g32 & -h31 & g34 \\ g41 & g42 & -h41 & g44 \end{bmatrix} \begin{bmatrix} Qa \\ Qr \\ \Phi a \\ Ql \end{bmatrix} \quad (16)$$

In equation (16), the vector on the left hand side contains all unknowns, including both the nodal potential and potential gradient values, while the vector on the right hand side contains all the known nodal conditions.

In equation (16), the unknown vector $Q_c$ and the known vector $\Phi_a$ have exchanged their positions with respect to equation (15). In a conventional BEM model, only vectors within the same boundary segment are exchanged, because the conventional BEM model always has one known boundary condition and one unknown boundary condition on each segment of the boundary. Since the vector exchange in conventional BEM is within the same boundary segment, the dimensions of the vectors involved, as well as the corresponding partitioned submatrices, are automatically the same. By contrast, in the inverse BEM model according to exemplary embodiments of the present invention, each element in the initial boundary function F has two unknown boundary conditions, and the vector exchange is between two different segments. Therefore, a condition is imposed so that the vectors are exchangeable. The condition for equation (16) to exist is that the number of elements for the anode boundary is equal to the number of elements for the initial boundary function F:

$$N_a = N_c \qquad (17)$$

This condition can be accommodated during the generation of the initial boundary function F.

After equation (16) is solved to determine the potential and potential gradient values of each boundary element defining the domain $D_1$, equation (10) is used to directly calculate an equipotential line in the domain $D_1$ as shown in step 5 of FIG. 3. The internal potential values $\phi^i$ within the domain $D_1$ are calculated analytically using the matrices $H^{ij}$ and $G^{ij}$ that correspond to each different internal point. The equipotential line in the gap represents the final tool shape, because the tool is formed of an electrically conductive material which has an equal potential on its surface, assuming that no surface overpotential changes exist. Any equipotential line in the gap represents a possible tool shape under the Uniqueness Theorem of the electric field and ECM theory.

Calculation of an equipotential line may be accomplished in one of two ways, for example. According to a first method, a point in the domain $D_1$ is located which corresponds to a desired gap size between the tool and the workpiece. The point may be located by extending a segment having a length equal to the desired gap size from the workpiece along the tool feed direction. Next, the electric potential at the point is calculated with equation (10). Finally, equation (10) is used to calculate a plurality of points having the same potential to form an equipotential line in the gap.

According to a second exemplary method, the equipotential line is calculated based on a desired operating voltage. According to this method, a point is located in the domain $D_1$ which has a potential difference with the workpiece potential equal to the desired operating voltage. Next, equation (10) is used to calculate a plurality of points in the domain $D_1$ at the same potential to form an equipotential line.

To find the equipotential points in the gap, a bisection method can be implemented for each node. The potential values may be calculated along the line defined by a workpiece node and its corresponding boundary function node along the workpiece normal direction.

For improved accuracy, a check can be performed after an equipotential line has been determined. For example, in the case of using the machining voltage to locate the equipotential line, the gap size between the equipotential line and the workpiece surface can be calculated, and vice versa. If the gap size significantly differs from the designated machining gap size, a surface overpotential value, for example ranging from 0–3 volts, may be subtracted from the machining voltage, and the gap size recalculated. The surface overpotential is a phenomenon caused by polarization of the electrolyte adjacent to the tool and workpiece surfaces, which reduces the effective voltage across the gap.

The tool surface is then formed to correspond with the desired equipotential line, as indicated in step 6 of FIG. 3, and the tool is used to form the workpiece surface, as indicated in step 7 of FIG. 3.

Figure 4:
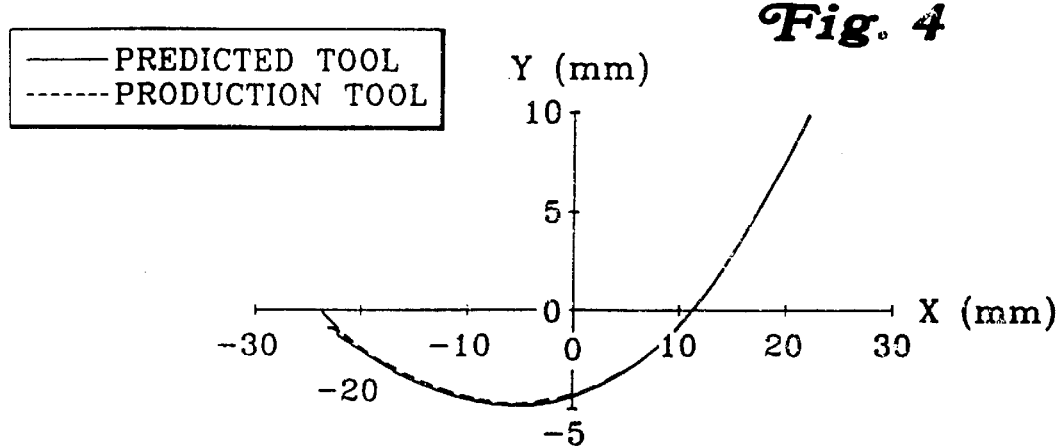
FIGS. 4 and 5 are graphs which illustrate the accuracy of an exemplary embodiment of the invention.
Figure 5:
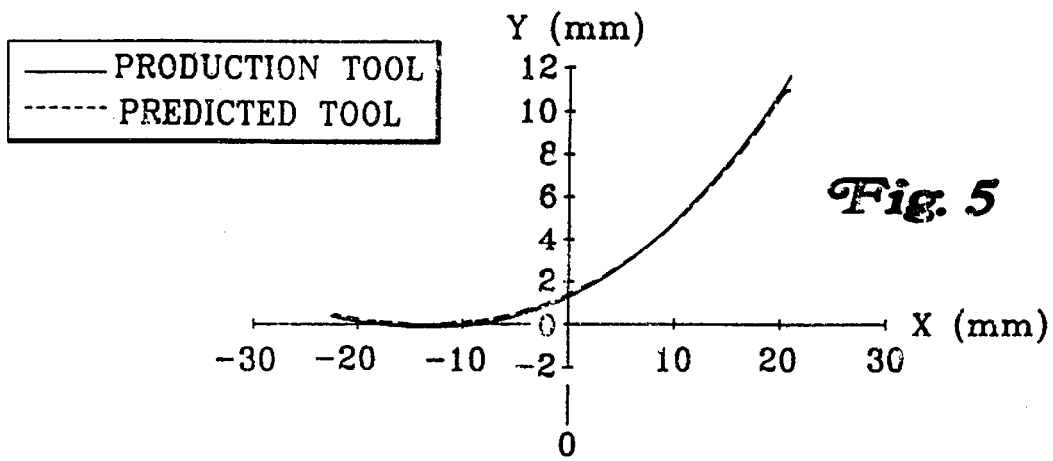

Exemplary embodiments of the invention produce results with improved accuracy. FIGS. 4 and 5 are graphs which show a comparison of a proven production tool and the shape of a tool determined by an exemplary embodiment of the invention. FIG. 4 shows the convex side of an airfoil, while FIG. 5 shows the concave side of the airfoil. As can be seen in the figures, the shape of the tool determined with exemplary embodiments of the present invention closely matches the shape of the proven production tool. The production tool geometry can produce high accuracy airfoils in practice, which verifies the accuracy of the exemplary method. The discrepancy shown in FIG. 5, between the production tool and the predicted tool shape, may arise partly from an inconsistency between the assumed conditions of the model and the actual machining conditions of the production tool. For example, changes in the overpotential, electrolyte conductivity, and current efficiency during machining may produce such a discrepancy. The accuracy can be improved if experimental data on overpotential and current efficiency are used to modify the anode boundary conditions. In addition, a model of the electrolyte conductivity, which accounts for changes in conductivity at different locations of the gap, can be used to further improve the accuracy of the prediction.

Exemplary embodiments of the invention provide at least two significant advantages over prior methods. First, the method is accurate, since the equipotential line which delineates the tool surface shape is calculated directly, without interpolation which introduces approximation errors. Secondly, because the surface of the tool is calculated directly from the boundary elements, the computational efficiency of the method is significantly increased. These factors can be particularly advantageous in an environment in which it is necessary to quickly and accurately produce a new workpiece shape, especially if the shape is complex. Exemplary embodiments of the invention can reduce design and iteration costs to a significant extent, since post-machining of the workpiece is significantly reduced due to the high accuracy of the method.

While the invention has been described with reference to particular embodiments, those skilled in the art will understand that various changes may be made without departing from the scope of the invention.

What is claimed is:

1. A method of shaping a workpiece with a tool comprising the steps of:

defining a gap between an initial too shape and the workpiece with a plurality of first boundary elements representing the initial tool shape and a plurality of second boundary elements representing the workpiece, wherein each of the first boundary elements is associated with an unknown potential and an unknown potential normal gradient, and each of the second boundary elements is associated with a known potential and a known normal gradient;

forming a matrix equation containing the first and second boundary elements, based on the Laplace equation;

exchanging in the matrix equation a first vector representing the unknown potential normal gradient of the tool with a second vector representing the known potential of the workpiece;

solving the matrix equation to determine values for the unknown potential and unknown potential normal gradient values associated with the first boundary elements;

directly determining an equipotential line in the gap using forward boundary element method;

forming the tool to have a surface which coincides with the equipotential line; and forming the workpiece with the tool.

2. A method in accordance with claim 1, wherein the known potential normal gradient associated with the second boundary element is obtained empirically.

3. A method in accordance with claim 1, wherein the known potential normal gradient associated with the second boundary element is obtained by measuring a volumetric electrochemical equivalent of an electrolyte and a conductivity of the electrolyte.

* * * * *